INVENTOR.
GARRETT P. KELLEY
BY John W. Michael
ATTORNEY

June 26, 1956  G. P. KELLEY  2,751,615
DOCKBOARD
Filed Feb. 8, 1954   3 Sheets-Sheet 2

INVENTOR.
GARRETT P. KELLEY
BY
John W. Michael
ATTORNEY

INVENTOR.
GARRETT P. KELLEY
BY
John W. Michael
ATTORNEY

United States Patent Office 2,751,615
Patented June 26, 1956

2,751,615
DOCKBOARD

Garrett P. Kelley, Milwaukee, Wis.

Application February 8, 1954, Serial No. 408,647

11 Claims. (Cl. 14—71)

This invention relates to a dockboard or ramp for use in shipping and receiving platforms and which adjusts to the height of the truck bed. The present ramp is operated by the truck backing toward the dock for loading or unloading and is entirely automatic in operation. If the truck bed is not parallel to the loading platform, the dockboard automatically adjusts flush with the surface over which the load is moving.

The principal object of this invention is to provide a simple, rugged dockboard which automatically adjusts to the height of a truck bed without requiring any operative force other than the truck backing into position.

Another object of this invention is to provide a dockboard of the type described which automatically adjusts to the slope of the bed of the truck with respect to the loading dock.

Other objects and advantages will be pointed out in, or be apparent from, the specification and claims, as will obvious modifications of the single embodiment shown in the drawings, in which:

Figure 1:
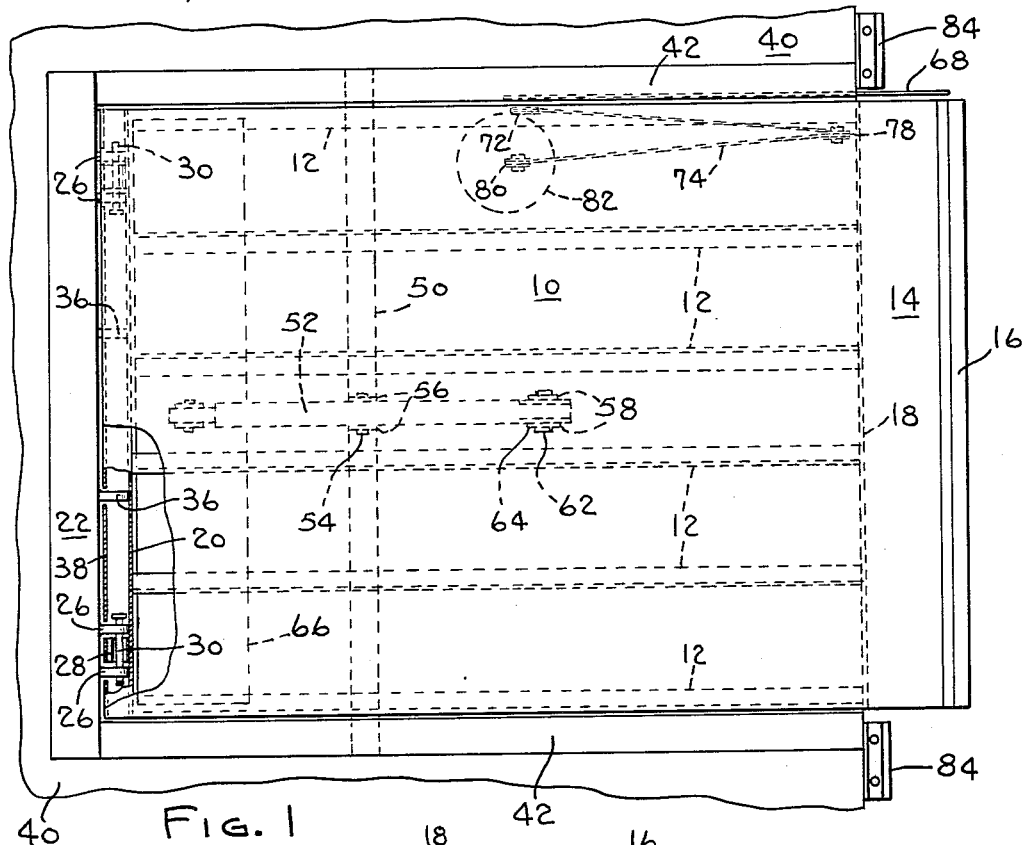
Fig. 1 is a plan view of the dockboard or ramp set into a shipping and receiving platform or dock.

Referring to the drawings now in detail, the dockboard or ramp 10 comprises a rectangular plate preferably provided with a suitable non-skid surface, not shown. Six parallel, longitudinal channels 12 serve as reinforcing ribs on the underside of the dockboard 10. The ribs may be further reinforced by lateral spanners, not shown. The ribs 12 terminate short of the lip portion 14 of the board which is reinforced on the underside with an additional plate 16. The outer ends of the ribs 12 are covered by a lateral plate 18. As will be explained more fully hereinafter, the lip section 14 is automatically adjusted in height to accommodate various heights of truck beds and is adapted to rest on the upper surface of the truck bed when the dockboard is in use.

Figures 7, 8:
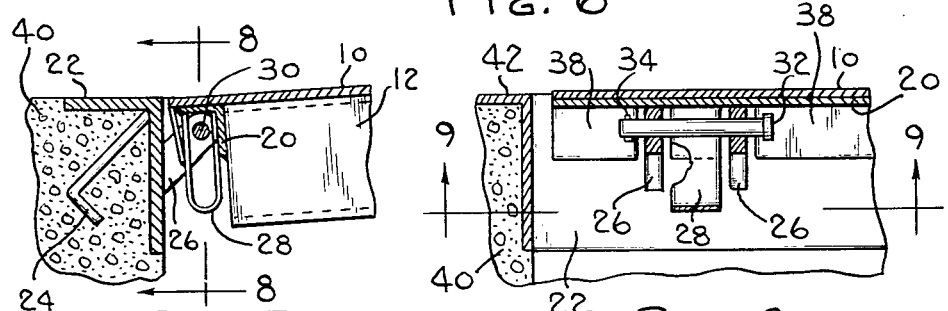
Fig. 7 is a detail of the hinge structure which allows the ramp to adjust to a slanting truck bed.
Fig. 8 is a view of a hinge from line 8—8 in Fig. 7.
Figure 9:
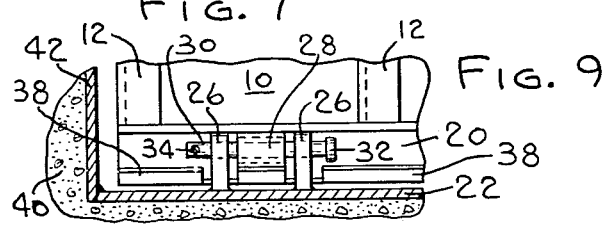
Fig. 9 is a bottom view of a hinge as indicated by line 9—9 on Fig. 8.

The reinforcing ribs 12 do not extend to the rear edge of the dockboard, thus providing space for lateral angle iron 20 welded to the underside of the dockboard 10 rearwardly of the ribs as most clearly shown in Fig. 7. A suitable angle iron 22 provided with anchor lugs 24 is set into the concrete loading dock at the rear edge of the dockboard and is provided with two pairs of spaced, upwardly projecting ears 26 adjacent the rear corners of the dockboard. These ears normally project up into the corner of angle 20 at the bottom rear edge of the dockboard as shown in Fig. 7 and support the rear edge of the dockboard in normal operation. Each of a pair of U-shaped straps 28 welded to angle iron 20 depends between a pair of fixed ears 26 and the ears are provided with aligned apertures to receive the headed hinge pin 30 which passes through the ears and through the U-shaped strap 28. The pin is held in place by means of its integral head 32 and a cotter pin 34. This structure serves as a hinge for the dockboard and permits either rear corner of the dockboard to be raised until the lowermost portion of the U-shaped strap 28 contacts the hinge pin. This allows the dockboard to cant with respect to the dock to adjust to a truck bed which is not parallel to the surface of the dock. Two additional lugs 36 are fixed on the stationary angle 22 near the midportion of the angle and project upwardly against the corner of angle 20 on the dockboard. These ears are not provided with hinge pins or the like, but merely give additional support to the dockboard. Finally, it has been noted that the rear edge of the dockboard is provided with a plurality of depending guard skirts 38 which prevent accidents as a result of the shearing action of the board as it adjusts to different slopes.

Figure 2:
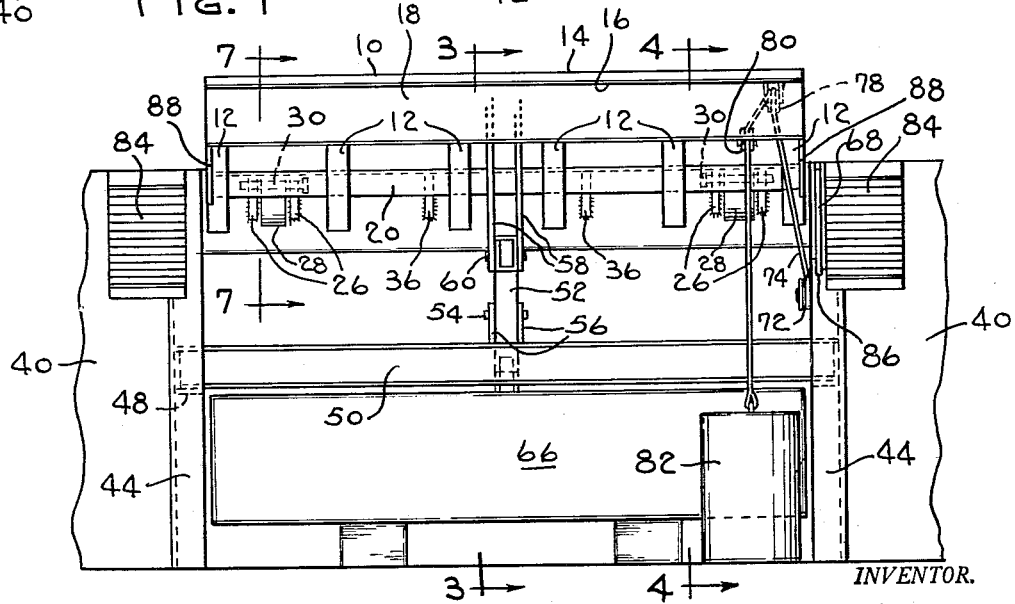
Fig. 2 is a front elevation of the ramp structure.

From the above, it will be noted that the dockboard 10 is hinged at its rearward edge to the angle 22 set in the dock 40. The dock is provided with an angle 42 at each side of the dockboard to reinforce the concrete edge at this point. As may be seen in the front elevation (Fig. 2), the forward vertical edges of the dock 40 are provided with vertical angles 44 and additional angles 46 are provided at the rear vertical corners of the dock to support an angle 48 therebetween at each side of the opening in the dock. These angles 48 support an I beam 50 which serves as a fulcrum support for the dockboard counterbalance mechanism.

The counterbalance mechanism comprises an arm 52 fulcrumed on pin 54 between upstanding lugs 56 mounted on the top of I beam 50. One end of the arm 52 is connected to the underside of dockboard 10 by means of links pivoted to the arm 52 at 60 and to the underside of the dockboard by pin 62 supported by depending plates 64. The other end of the arm 52 pivotally supports a counterbalance weight 66 which may conveniently be a large block of concrete. It is to be noted that the arm 52 is of telescopic nature to permit adjustment of the leverage arm to overcome the weight of the board and to slightly bias the dockboard to its fully raised position (shown in Figs. 2 through 4). The upward biasing force is small and little effort is required, therefore, to lower the dockboard.

Figure 3:
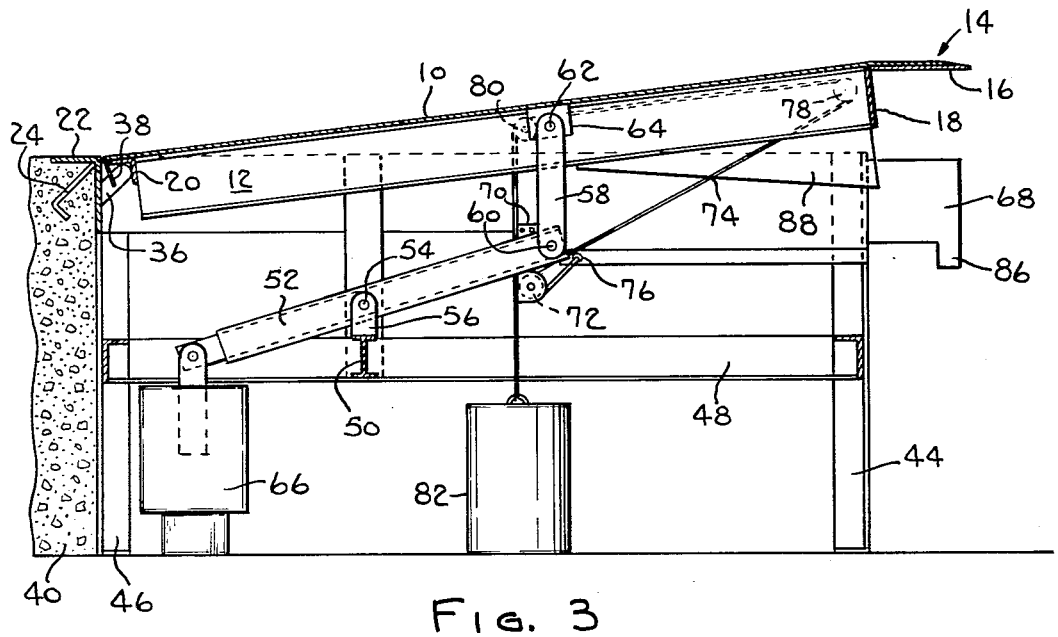
Fig. 3 is a section taken on line 3—3 of Fig. 2.
Figure 4:
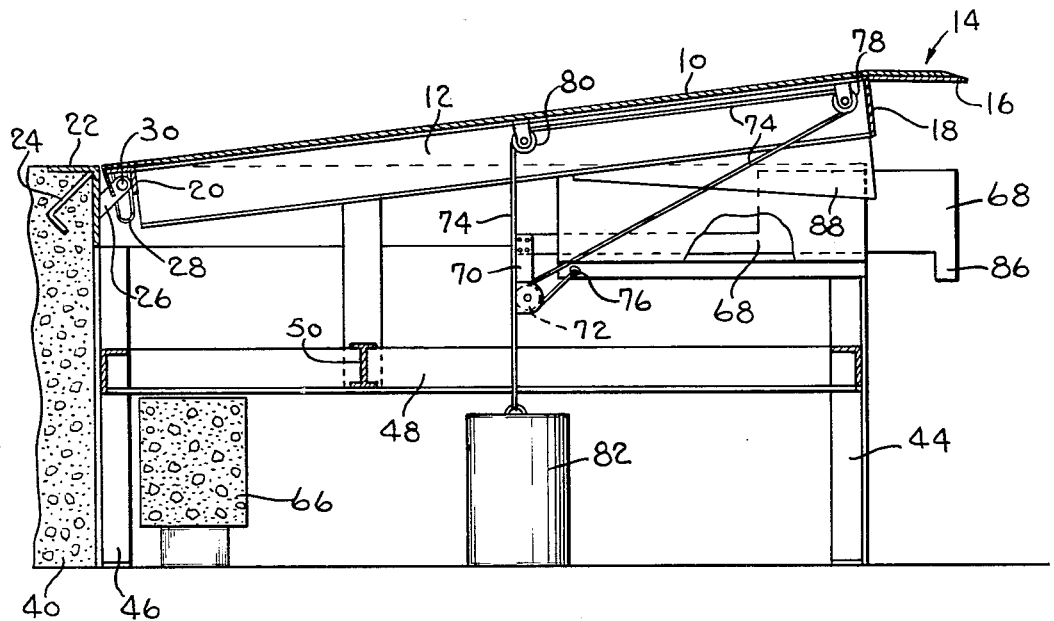
Fig. 4 is a section taken on line 4—4 of Fig. 2.
Figure 5:
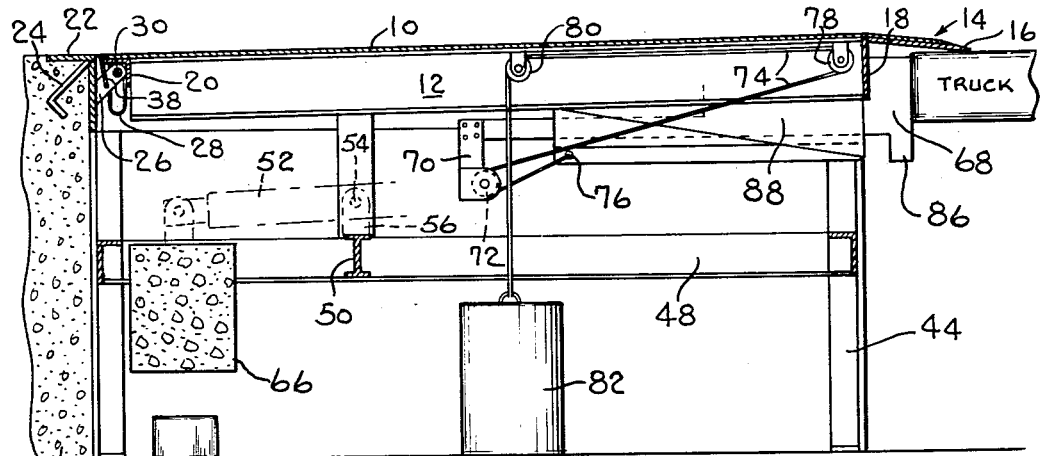
Fig. 5 is a view similar to Fig. 4 but shows the ramp resting on the bed of the truck.
Figure 6:
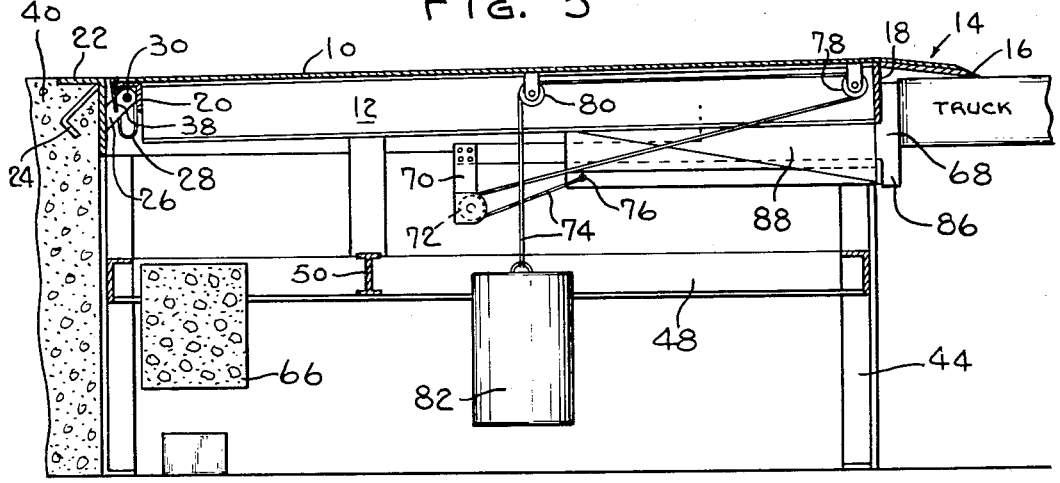
Fig. 6 is similar to Figs. 4 and 5 but shows the manner in which the secondary weight allows overtravel of the operating arm after the ramp contacts the truck bed.

Operating arm 68 is reciprocally mounted between two plates fixed on right hand side (Fig. 2) of the stationary framework. The outer end of the operating arm is adapted to be actuated by a truck backing towards the loading dock, while the inner end of the operating arm is provided with a depending arm 70 which supports a pulley 72. A cable 74 is fixed to a stationary portion of the dockboard framework as at 76 and is reeved over pulley 72 and over pulleys 78, 80 on the underside of the dockboard and is attached to secondary weight 82. Much more force is required to lift the weight 82 than is required to lower the counterbalanced dockboard. Accordingly, when the bed of a truck backing into the dock moves the end of operating arm 68 inwardly, the relative movement between movable pulley 72 and the fixed cable anchor point 76 will pull on the cable system to lower the dockboard until the lip 14 rests on the truck bed as in Fig. 5. Reference to Fig. 5 will show that relative movement between pulley 72 and the fixed cable support 76 has taken place and that the counterbalance weight 66 has been raised from its initial position (Fig. 3). If the trucker continues to back the truck toward the dock, the dockboard obviously cannot be lowered further and the tension in the cable increases and finally raises secondary weight 82 as shown in Fig. 6. Thus, the weight 82 serves as an anchor for the cable system until the downward motion of the dockboard has been arrested. At this time, continued pressure of the truck against the arm increases the force transmitted through the cable until the weight 82 is raised to permit continued rearward movement of the arm independently of the dockboard. In this respect, the weight 82 and the manner in which it is connected into the cable system, functions as a force-responsive lost motion means.

From the above, it will be obvious that a truck backing into the loading dock can back in until the truck bed strikes the bumpers 84 on each side of the dockboard. The operating arm cannot be damaged by the truck since any overtravel of the arm occasioned by the lip of the dockboard resting on the truck prior to full movement of the operating arm raises the secondary weight 82. It is to be noted that the operating arm is provided with a depending finger 86 which presents added vertical height to accommodate truck beds of various heights.

When the truck backs into the dock, if the bed of the truck is not parallel to the surface of the dock, the hinge structure described above permits the board to adjust about the two hinges. When the load, in the form of a lift truck, hand truck or other material handling equipment, is moved from the dock to the dockboard, the dockboard will adjust to make the two adjacent surfaces parallel. As the load moves over the dockboard to the truck, the shift in the weight will cause the lip of the dockboard to rest squarely on the bed of the truck. At this time, one of the rear corners of the dockboard would be raised but damage to persons on the dock is prevented by the depending toe guards 38. In this connection, it is to be noted that the sides of the dockboard are provided with depending toe guards 88 which prevent injuries as the board is lowered.

As the truck pulls away from the dock, the secondary counterweight 82 lowers from the position in Fig. 6 to the position in Fig. 5. Further movement of the truck away from the dock allows the counterbalance 66 to raise the dockboard to its highest position as shown in Figs. 1 through 4. The highest position of the board can be determined in several ways. In the drawings, contact of the weight 66 with the ground or blocks is employed to limit the upward movement of the board. If desired, contact of arm 70 with the frame can act as the limit stop or the hinge can be made of a limiting nature. Similarly, cables or the like could be fixed to the frame and the underside of the board to limit the action.

The secondary counterweight 82 could be replaced by other biasing mechanism which would more than offset the force necessary to move the counterbalanced dockboard downwardly as the truck backs in against the operating arm 68. Such a spring would, of course, be connected between the operating arm and to the dockboard. Another form the present device could take would be the provision of a sliding counterweight which would move toward the pivot point as the operating arm moved inwardly, thus allowing the dockboard to fall to the truck bed. When a truck pulled away, a spring would then return the counterweight to its original position. In either of these forms, the cost of the springs dictates against the modifications.

A cross-traffic lock can be provided to hold the dockboard in a positon level with the dock when the dockboard is not being used to unload a truck. Such a cross-traffic lock has not been shown since it may be any of a number of different conventional constructions.

As shown in the drawings, the dockboard is provided with a frame comprised of various angles, channels, etc. which readily permit use of the present structure without requiring the use of a concrete dock on the sides of the dockboard. In other words, the illustrated structure would serve equally as well where the dockboard is not to be built into the dock. When the dockboard is built into a dock, much of the structural framework elements shown in the drawings can be eliminated without any adverse effects on the function and operation of the unit. With this in mind, reference to a frame or framework in the claims is not to be considered restricted to structural frames such as illustrated.

Variations in the structure will occur to those skilled in the art and equivalent apparatus may be substituted for various components without departing from the spirit of this invention. Accordingly, this invention is to be limited only by the scope of the claims.

I claim:

1. An adjustable dockboard comprising a frame, a dockboard pivotally mounted at its rear edge on said frame, means approximately counterbalancing the weight of the dockboard and exerting a force on the dockboard in an amount and in a direction to raise the dockboard, an operating arm mounted for fore and aft reciprocation in the frame and with respect to the dockboard and normally projecting forwardly therefrom to be moved rearwardly when contacted by a truck backing up towards the dockboard and motion transmission means interconnecting the arm and the board to exert a downward force on said board in response to rearward movement of the arm to overcome the raising force exerted on the board by said counterbalancing means so that the rearward movement of the arm lowers the board onto the bed of said truck, said motion transmission means including force-responsive lost motion means operative when a force of predetermined magnitude is developed in said motion transmission means to permit continued rearward movement of the arm after the downward movement of the dockboard has been arrested.

2. A dockboard according to claim 1 in which the motion transmission means comprises a cable having one end fixed to the frame and reeved over said arm and said board and having its other end secured to a movably supported weight, said weight being moved by said cable when a force of said predetermined magnitude is developed therein.

3. A dockboard according to claim 1 in which the counterbalance means comprises a lever fulcrumed on said frame and having one end connected to said board and the other end connected to a counterweight.

4. An adjustable dockboard comprising a frame, a dockboard, means movably mounting the dockboard on said frame for pivotal movement about a substantially horizontal axis, counterbalancing means operatively connected to the dockboard for overcoming the weight of the board and for exerting a net force on the board in an amount and in a direction to raise the board about said horizontal axis, an operating arm movably mounted in the frame for movement with respect to the dockboard between a projected position and a retracted position, and motion transmission means interconnecting said arm and said board whereby the arm is normally maintained in projected position when the board is raised under the influence of said counterbalancing means, for contact by a truck backing towards the dockboard, said motion transmission means being effective to exert a downward force on said dockboard in response to movement of the arm from projected to retracted position to lower the dockboard onto the bed of the truck, said motion transmission means including force-responsive lost motion means operative to permit continued movement of the arm towards retracted position after the force developed in the motion transmission means exceeds a predetermined magnitude due to the downward movement of the dockboard being arrested.

5. Apparatus according to claim 4 in which said motion transmission means comprises a cable fixed at one end to said frame and reeved over said arm and said board and secured at its opposite end to a movable weight which requires a greater force to move than the force tending to move the board to its raised position, said weight being adapted to rest on a fixed support when the board is in its raised position.

6. A dockboard according to claim 4 in which the hinge connection between the rear edge of the dockboard and the frame comprises two spaced hinges each including means permitting limited vertical movement of the dockboard with respect to the frame adjacent either of said hinges to allow the surface of the dockboard to adjust angularly with respect to the surface of the dock served by the dockboard.

7. A dockboard according to claim 6 including depending skirts around the rear and sides of the dockboard to prevent entrance of objects between the dockboard and the frame when the board is raised or is angularly adjusted with respect to the frame.

8. Apparatus according to claim 4 including a pulley mounted on said arm and a pulley on said board, said motion transmission means comprising, a cable fixed at one end to said frame and at its other end to a weight and reeved over said pulleys, said weight resting on a fixed support when said arm is fully projected, said pulleys being so located that actuation of said arm increases the distance between the pulleys and causes the board to be drawn downwardly into contact with the bed of the truck actuating the arm whereupon further movement of the arm causes said weight to be lifted from said support.

9. An adjustable dockboard comprising a frame, a dockboard having its rear edge pivotally connected to said frame for movement between raised and lowered positions, an arm mounted on the frame for movement between projected and retracted positions relative to said board, motion transmission means interconnecting the board and the arm, means to bias the board to said raised position and to urge the arm to said projected position for actuation to retracted position by a truck backing towards the dockboard, said motion transmission means interconnecting the board and arm including means responsive to movement of the arm toward said retracted position to exert a force in a downward direction on said board to draw the board downwardly until the board contacts the bed of the truck actuating the arm.

10. A dockboard according to claim 9 in which the motion transmission means includes force-responsive lost motion means operable when the force developed within said motion transmission means exceeds a predetermined amount to permit continued movement of the arm towards retracted position after downward movement of the dockboard has been arrested by contact with the bed of the truck.

11. An adjustable dockboard assembly comprising a frame, a dockboard carried by said frame and mounted for pivotal movement about its rear edge between raised and lowered positions, an arm mounted on the frame for movement between projected and retracted positions relative to said board, motion transmission means interconnecting the board and the arm, means to bias the board to said raised position and to urge the arm to said projected position for actuation to retracted position by a truck backing towards the dockboard, said motion transmission means being responsive to movement of the arm toward retracted position to lower the dockboard onto the bed of the truck.

References Cited in the file of this patent

UNITED STATES PATENTS

| | | |
|---|---|---|
| 937,375 | Logan | Oct. 19, 1909 |
| 1,112,543 | Love | Oct. 6, 1914 |
| 2,585,695 | Snow | Feb. 12, 1952 |

OTHER REFERENCES

Dockboard Incorporated, "Hi-Lo Self Adjusting Dockboard," May 22, 1953.